United States Patent [19]
Warner

[11] Patent Number: 5,963,129
[45] Date of Patent: Oct. 5, 1999

[54] VEHICLE IDENTIFICATION AND INFORMATION SYSTEM CONTROL DEVICE AND SYSTEM

[76] Inventor: Kevin Warner, 2918 Alouette Dr., #724, Grand Prairie, Tex. 75052

[21] Appl. No.: 08/980,708

[22] Filed: Dec. 1, 1997

[51] Int. Cl.⁶ .................................................. B60Q 1/26
[52] U.S. Cl. ................ 340/468; 340/425.5; 340/426; 340/438; 340/461; 340/463; 340/524; 340/825.45; 340/988; 340/989; 340/991; 340/993
[58] Field of Search ..................... 340/539, 988, 340/989, 425.5, 426, 541, 438, 461, 463, 524, 825.45, 991, 993, 468

[56] References Cited

U.S. PATENT DOCUMENTS

| | | | |
|---|---|---|---|
| 4,001,822 | 1/1977 | Sterzer | 343/6.5 SS |
| 5,053,746 | 10/1991 | Taneo | 340/473 |
| 5,105,179 | 4/1992 | Smith | 340/468 |
| 5,500,638 | 3/1996 | George | 340/468 |
| 5,513,244 | 4/1996 | Joao et al. | 379/58 |
| 5,515,043 | 5/1996 | Berard et al. | 340/988 |
| 5,515,285 | 5/1996 | Garrett, Sr. et al. | 364/460 |
| 5,521,815 | 5/1996 | Rose, Jr. | 364/409 |
| 5,629,693 | 5/1997 | Janky | 340/988 |
| 5,630,209 | 5/1997 | Wizgall et al. | 455/66 |
| 5,657,008 | 8/1997 | Bantli | 340/933 |
| 5,682,133 | 10/1997 | Johnson et al. | 340/426 |
| 5,708,417 | 1/1998 | Tallman et al. | 340/539 |
| 5,721,540 | 2/1998 | Ellis | 340/988 |
| 5,742,227 | 4/1998 | Escareno et al. | 340/426 |
| 5,745,033 | 4/1998 | Jenkins, Jr. et al. | 350/539 |

*Primary Examiner*—Daniel J. Wu
*Assistant Examiner*—Toan N. Pham
*Attorney, Agent, or Firm*—Michael I. Kroll

[57] ABSTRACT

A vehicle identification and information system for obtaining information on a plurality of vehicles is disclosed by the present invention. The system includes an identification unit, a remote unit and a central microprocessor. The identification unit is installed in each of the plurality of vehicles and includes a first receiver for receiving information signals containing information regarding the vehicle from the central computer, a display device positioned on said vehicle for displaying information regarding the vehicle contained within the received information signal and an emergency signaling device for transmitting a distress signal to the receiver for display on the display device. The remote unit is positioned in a monitoring station and includes a transmitter for transmitting an information request signal to the central computer, a receiver for receiving an information response signal from the central computer, a microprocessor for processing the information response signal and a device for displaying the information received from the central computer. The central computer includes a database for storing the information regarding the plurality of vehicles and generates an information signal for transmission to both the identification unit and the remote unit.

9 Claims, 6 Drawing Sheets

FIG 2

| VEHICLE # | ID# | LIC # | REG. | INS. | STATE | MESSAGE |
|---|---|---|---|---|---|---|
| 1 | AAAAA | 123456 | N | Y | TEXAS | HANDICAP/ TAGS EXPIRED |
| 2 | BBBBB | ABC123 | Y | Y | LOUISIANA | DRIVE SAFELY |
| 3 | CCCCC | ABCDEF | Y | Y | CALIFORNIA | *CALL POLICE |
| 4 | DDDDD | 123ABC | Y | N | MARYLAND | NO INSURER |

FIG 4

| PLEASE HELP |
|---|
| 123 456 |
| TEXAS |

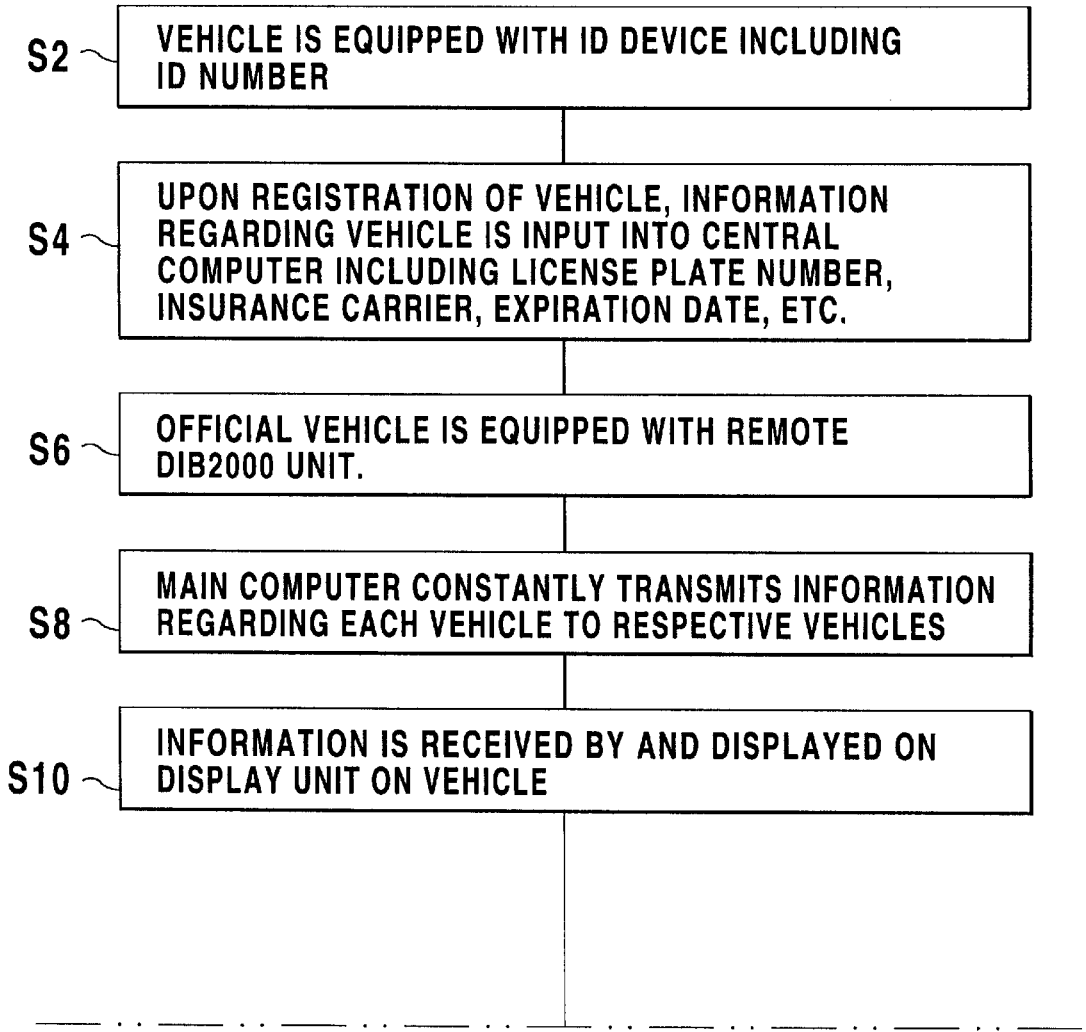

VEHICLE IDENTIFICATION AND INFORMATION SYSTEM CONTROL DEVICE AND SYSTEM

BACKGROUND OF THE INVENTION

1. Field of the Invention

The instant invention relates generally to identification systems and, more specifically, to a vehicle identification system able to transmit and receive identification or information on a particular vehicle in transit.

2. Description of the Prior Art

Numerous identification systems have been provided in the prior art. For example, U.S. Pat. Nos. 4,001,822; 5,053,746; 5,105,179 and 5,500,638 all are illustrative of such prior art. While these units may be suitable for the particular purpose to which they address, they would not be as suitable for the purposes of the present invention as heretofore described.

An electronic license tag or plate formed into a unitary structure and including a single antenna system cooperating in a system comprising a harmonic radiator which transmits a pulse coded identification signal in response to an interrogation signal, and in a signal communication path for detecting and decoding code modulations in the interrogation signal and deriving therefrom an information signal which is communicated to the operator of a vehicle to which the tag or plate is affixed.

A vehicular communication device includes a visual display panel comprising a matrix of LED light members operative through a controller and keyboard. The panel is mounted rearwardly of a vehicle forwardly of the trunk lid. The panel includes bracket members for securement of the panel to the vehicular trunk overlying a vehicular bumper. The panel may optionally include hydraulic cylinder to pivot the panel for enhanced visual positioning relative to a rearwardly positioned individual.

An electronic display license plate and message center for use on automobiles and other vehicles. The electronic display license plate is a replacement for the standard metal license plate, and may be constructed as a part of the car, such as an integral part of the taillight assembly, or may be constructed as a bolt-on replacement module for existing license plates. The display may be constructed from an array of light-emitting diodes, or a liquid crystal display, or from an electroluminescent panel. A configuration cartridge, typically containing a read only memory (ROM) circuit, contains license plate information such as state, county, license number, and expiration date, configures the display for the particular vehicle. The electronic display license plate may also contain circuitry to detect the expiration of the license and appropriately indicate that expiration by flashing or inverting the display, or causing it to go blank.

A method of communication between vehicle operators. The invention employs common display LED's, the segments of which when appropriately turned on issue desired messages on the reader board for the operators of other vehicles. To issue a message the operator of a vehicle simply depresses a button on the control box, the operator of a vehicle behind sees the message for a length of time set by a monostable timer.

SUMMARY OF THE PRESENT INVENTION

The instant invention relates generally to identification systems and, more specifically, to a vehicle identification system able to transmit and receive identification or information on a particular vehicle in transit.

A primary object of the present invention is to provide a vehicle identification system that will overcome the shortcomings of prior art devices.

Another object of the present invention is to provide a vehicle identification system which is able to warn others as to an emergency situation in a vehicle.

An additional object of the present invention is to provide a vehicle identification system which includes a central computer able to relay information to a police vehicle regarding the insurance status and record of any violations on a vehicle.

A further object of the present invention is to provide a vehicle identification system which is able to inform others if a vehicle has been stolen.

A yet further object of the present invention is to provide a vehicle identification system which is able to provide vehicle status information on a moving vehicle.

A still further object of the present invention is to provide a vehicle identification system including an internal identification transmitter which may be accessed by the central computer to display information regarding the vehicle on a vehicle display.

An even further object of the present invention is to provide a vehicle identification system wherein a switch will inform others as to an emergency situation within the vehicle when activated even while the vehicle is traveling.

Another object of the present invention is to provide a vehicle identification system that is simple and easy to use.

A still further object of the present invention is to provide a vehicle identification system that is economical in cost to manufacture.

Additional objects of the present invention will appear as the description proceeds.

A vehicle identification and information system for obtaining information on a plurality of vehicles is disclosed by the present invention. The system includes an identification unit, a remote unit and a central microprocessor. The identification unit is installed in each of the plurality of vehicles and includes a first receiver for receiving information signals containing information regarding the vehicle from the central computer, a display device positioned on said vehicle for displaying information regarding the vehicle contained within the received information signal and an emergency signaling device for transmitting a distress signal to the receiver for display on the display device. The remote unit is positioned in a monitoring station and includes a transmitter for transmitting an information request signal to the central computer, a receiver for receiving an information response signal from the central computer, a microprocessor for processing the information response signal and a device for displaying the information received from the central computer. The central computer includes a database for storing the information regarding the plurality of vehicles and generates an information signal for transmission to both the identification unit and the remote unit.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views.

FIG. 2 is a perspective view of the display of the remote unit used in the vehicle identification and information system of the present invention;

FIG. 4 is a perspective view of the display attached to a vehicle in accordance with the vehicle identification and information system of the present invention;

DESCRIPTION OF THE REFERENCED NUMERALS

Figure 1:
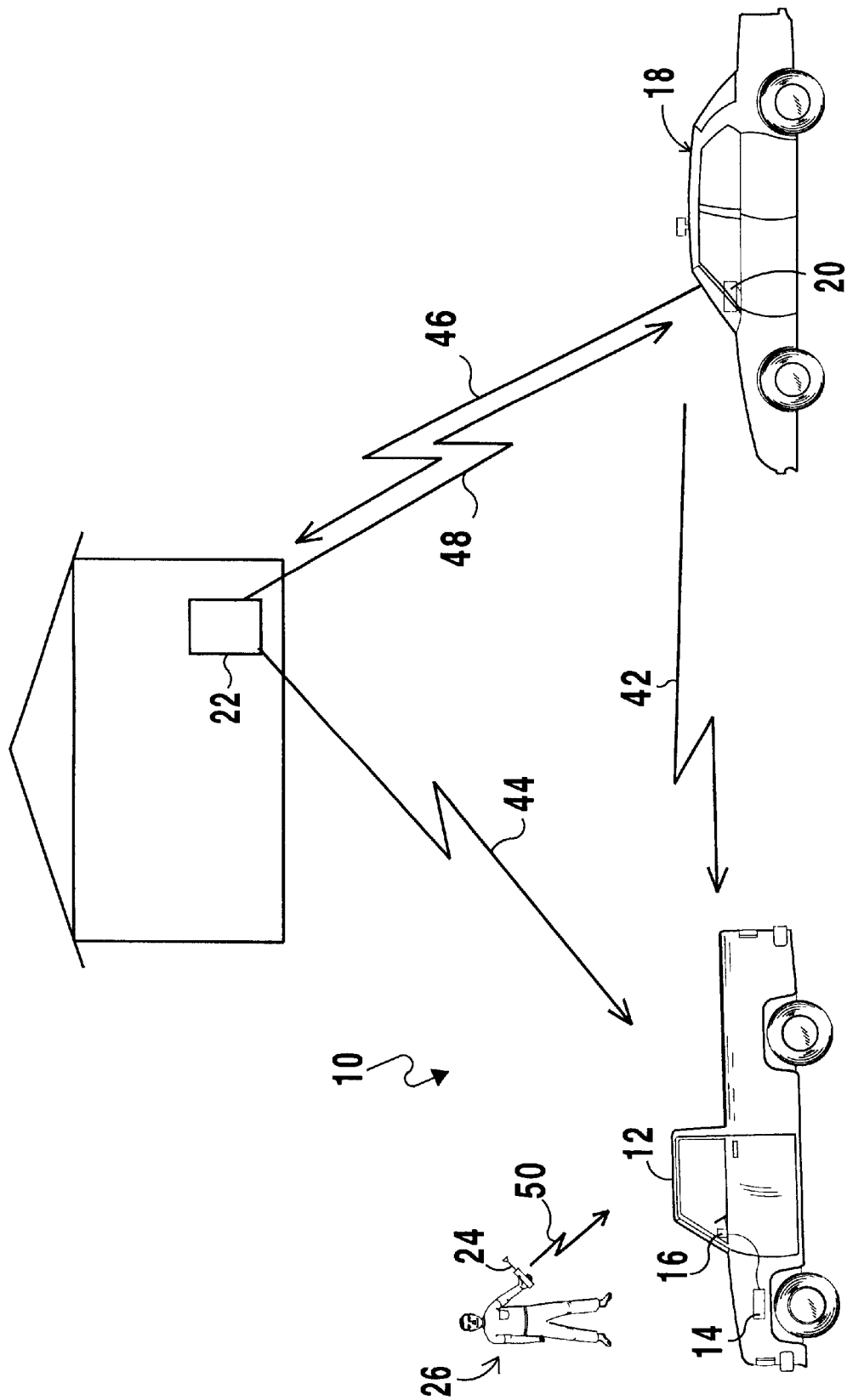
FIG. 1 is a schematic diagram illustrating the vehicle identification and information system of the present invention.

Turning now descriptively to the drawings, in which similar reference characters denote similar elements throughout the several views, the Figures illustrate the vehicle identification and information system of the present invention. With regard to the reference numerals used, the following numbering is used throughout the various drawing figures.

10 vehicle identification and information system of the present invention
12 vehicle
14 identification unit
16 emergency button
18 official vehicle
20 remote unit
22 central computer
24 remote control device
26 vehicle owner
28 display for remote unit
30 identification number of vehicle
32 license number of vehicle
34 state of registration
36 registration status of vehicle
38 insurance status of vehicle
40 identification message
42 transmission signal from remote unit
44 identification signal from central computer to identification unit
46 information request signal for received identification number
48 information signal from central computer
50 distress signal from remote control unit
52 microprocessor for identification unit
54 power source for identification unit
60 receiver for identification unit
62 receiver antenna for identification unit
64 memory for identification unit
66 license plate number on vehicle display
68 state of registration of vehicle on vehicle display
70 message on vehicle display
72 microprocessor for remote unit
74 power source for remote unit
76 transmitter for remote unit
78 transmitter antenna for remote unit
80 receiver for remote unit
82 receiver antenna for remote unit
84 display for remote unit
86 temporary power button

DETAILED DESCRIPTION OF THE PREFERRED EMBODIMENT

Turning now descriptively to the drawings, in which similar reference characters denote similar elements throughout the several views, FIGS. 1 through 6 illustrate a vehicle identification and information system indicated generally by the numeral 10.

The vehicle identification and information system 10 provides information on a particular vehicle 12 via an identification unit 14 including an emergency button 16 to both individuals in the area surrounding the vehicle 12 and to official vehicles such as police cars 18. The vehicle identification and information system 10 further includes a remote unit 20 positioned within the official vehicle 18 and a central computer 22 which communicates with the remote unit 20 for providing information regarding a particular vehicle 12 thereto. A remote control device 24 may also be operated by the user or owner 26 of the vehicle 12 for initiating the displaying of a distress signal such as "STOLEN" on a display unit 28 connected to the vehicle 12. The information displayed on the display unit 28 is to alert others in the vicinity of the vehicle 12 as to any situations or events involving the vehicle 12.

The vehicle identification and information system 10 is ideally included in every vehicle registered with the department of motor vehicles in every state in the country and the information is accessible from a central database or computer 22. When a vehicle 12 is manufactured the identification unit 14 is installed therein and upon sale of the vehicle 12 the necessary information such as that depicted on a display 84 as illustrated in FIG. 2 is input to the central computer 22. The necessary information includes an identification unit ID number 30, a vehicle license plate number 32, the state of vehicle registration 34, information regarding current registration 36 and insurance coverage 38 and a message regarding the status of the vehicle 40. Other additional information such as identification of the driver including address, telephone number and other identifying information may be stored within the central computer 22 for access by authorized personnel such as the police.

The central computer 22 communicates with the identification unit 14 in a particular vehicle 12 by wirelessly transmitting an information signal 44 thereto related to the status of the vehicle, e.g. "no insurance", "stolen", etc. and other pertinent information. The signal 44 is received by the identification unit 14 which displays the message on the display unit 28 from which the message can be viewed by persons in the vicinity of the vehicle 12. The owner 26 of the vehicle 12 is also supplied with a remote control unit 24 which can wirelessly transmit a signal 50 to the vehicle 12 to display a message on the display 28 indicating the vehicle 12 is stolen. The official vehicle 18 can also wirelessly transmit a signal 42 to the identification unit 14 indicating the vehicle is stolen. This signal may then be displayed on the display unit 28. This is in case the owner of the vehicle does not have a remote control device 24 or the vehicle 12 has been reported stolen. In order for the official vehicle to transmit the signal to the vehicle 12 a request signal would have to be transmitted to the central computer 22 requesting the identification number of the identification unit 14. The official vehicle 18 can also receive information regarding a particular vehicle 12 from the central computer 22 by transmitting an information request signal 46. This signal 46 would have to identify the vehicle 12 in some manner such as by including the license plate number of the vehicle 12. Upon receipt of this information request signal 46, the central computer 22 will transmit an information response signal 48 including the desired information for viewing on a display unit 84 within the official vehicle 18. If the information indicates the vehicle 12 is not registered as is indicated for vehicle 1 in FIG. 2 or uninsured as indicated for vehicles 1 and 4 of FIG. 2 the police can be alerted to this situation and stop the vehicle. Other information can be included such as the messages of column 40 which can indicate whether or not the vehicle should be stopped as for vehicle 3 of FIG. 2. This will alert persons in the area of the vehicle 12 as to the situation and thus take the appropriate action.

Figure 3:
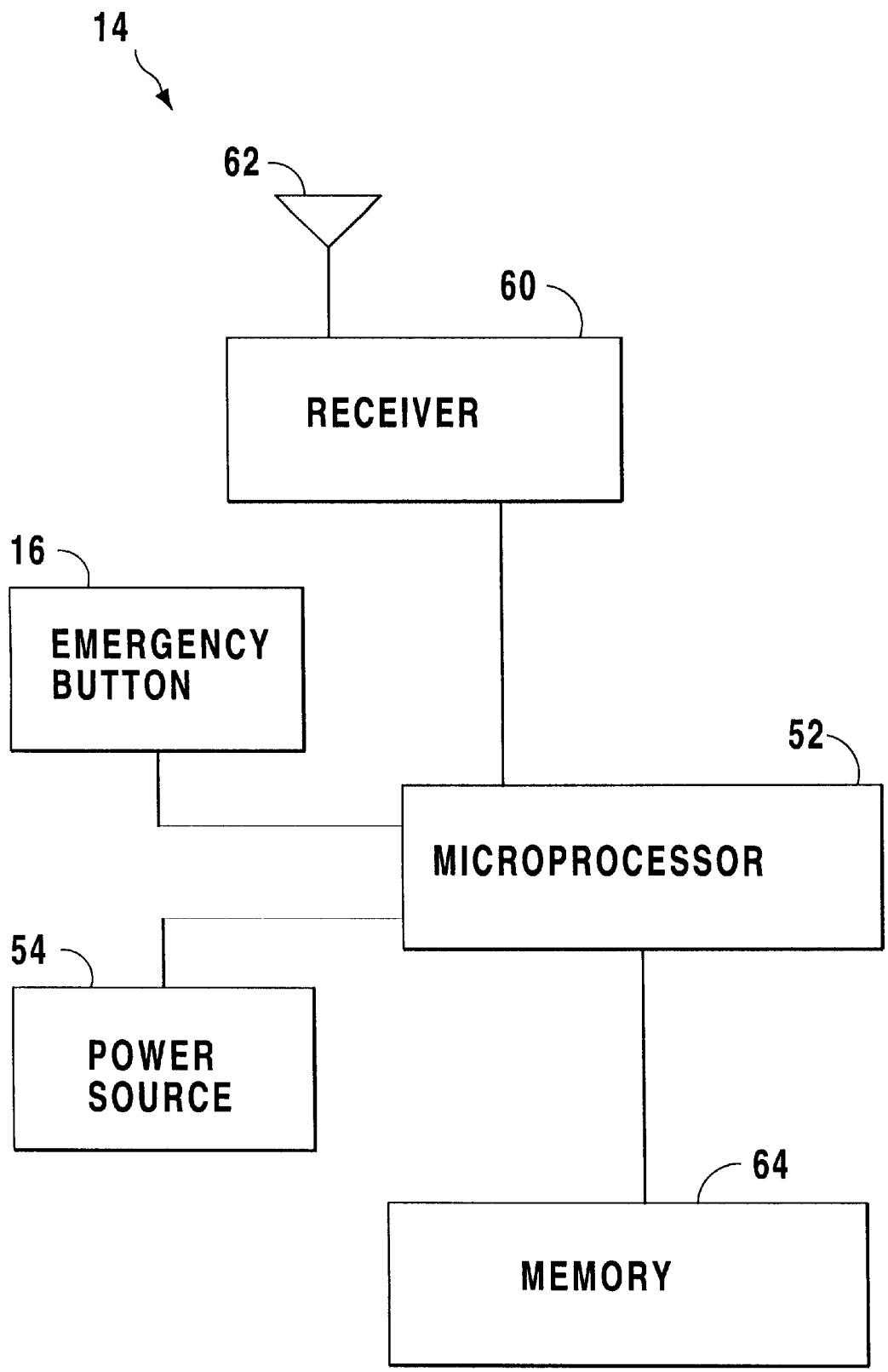
FIG. 3 is a block diagram illustrating the internal components of the identification unit of the vehicle identification and information system of the present invention.

The internal components of the identification unit 14 are illustrated in FIG. 3. The identification unit 14 includes a microprocessor 52 connected to receive power from a power source 54 which may be the vehicle's 12 battery or a separate power source located within the vehicle 12. A memory 64 storing certain information regarding the vehicle 12 and identification unit 14 is connected to the microprocessor 52. A receiver 60 which receives signals transmitted from the central computer 22, the remote control unit 24 and remote unit 20 via an antenna 58 is connected to the microprocessor 52. The microprocessor 52 also receives signals from the emergency button 16 located within the vehicle 12. The microprocessor 52 analyzes the signals received from the receiver 60 and emergency button 16. The microprocessor 52 is also connected to the display unit 28 and transmits the analyzed information to the display unit 28 alerting persons in the vicinity of the vehicle 12 as to the current status of the vehicle 12. Information is also transmitted to the display unit 28 upon receipt of a distress signal from the remote control unit 24 or an alert signal received from either the remote unit 20, central computer 22 or remote control unit 24.

A preferred embodiment of the display unit 28 is illustrated in FIG. 4. The display unit 28 is preferably located on the tailgate of the vehicle 12 and displays the license plate number 64, the state of registration 66 and a message as to the vehicle's current status 68. The message may indicate that the vehicle 12 is "STOLEN" as in FIG. 4. Other messages include "PLEASE HELP" indicating the operator of the car needs assistance, "CALL POLICE" indicating a crime may be taking place, "HANDICAPPED" indicating the operator or a passenger in the vehicle is handicapped, or "DRIVE SAFELY" indicating all is well.

It is to be understood that the present invention is not limited to use of the message display 28 as described above. Any type of message display such as a display including a speaker system for producing an audio signal to thus draw additional attention to the vehicle in an emergency situation may be used and connected to the vehicle in any visible location. Thus, the message display 28 is able to communicate any desired message to persons in the vicinity and is not limited to the display as described above.

Figure 5:
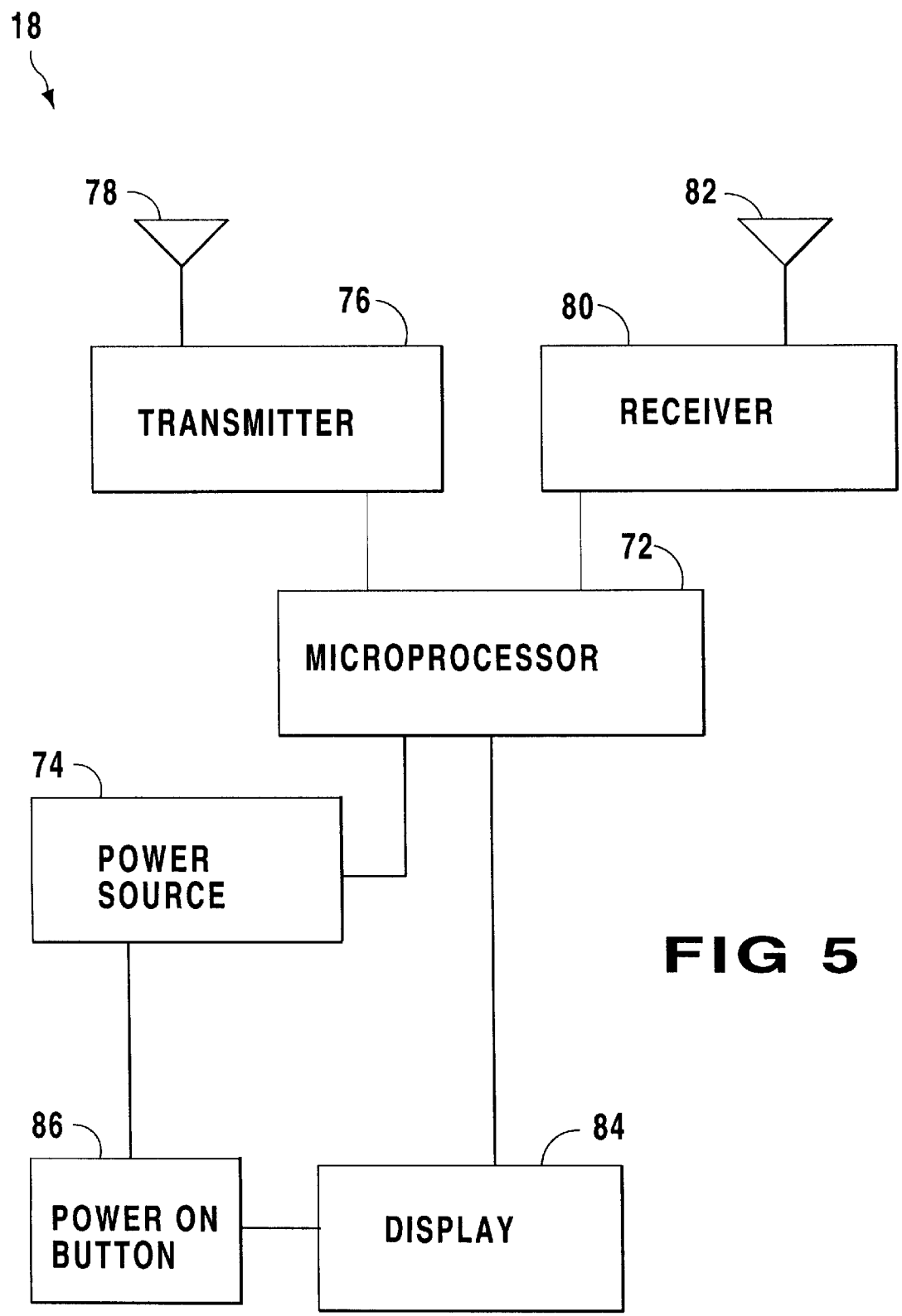
FIG. 5 is a block diagram illustrating the internal components of the remote unit for use in the vehicle identification and information system of the present invention.

The internal components of the remote unit 20 are depicted in FIG. 5. The remote unit 20 includes a microprocessor 72. The microprocessor 72 receives power from a power source 74 such as the vehicle battery or another internally located power source. The remote unit 20 includes a transmitter 76 and antenna 78 for transmitting an emergency signal to the identification unit 14 in a particular vehicle 12 indicating the vehicle is stolen and an information request signal to the central computer 22. An information signal 48 is received from the central computer 22 in response to the information request signal 46 via a receiver 80 and antenna 82 combination. The information contained in the information signal 48 received from the central computer 22 is displayed on the display unit 84 for viewing by the requester. An exemplary display unit 84 is illustrated in FIG. 2. The requester is normally a government official using the official vehicle 18 such as a police officer. Also connected between the power source 74 and the display 84 is a temporary power button 86 for providing power to the display 84 for a period of time after the vehicle is turned off. Thus, the display 84 is visible for a period of time and thus can be viewed by a police officer or any person in the vicinity in case of an emergency situation.

Figure 6B:
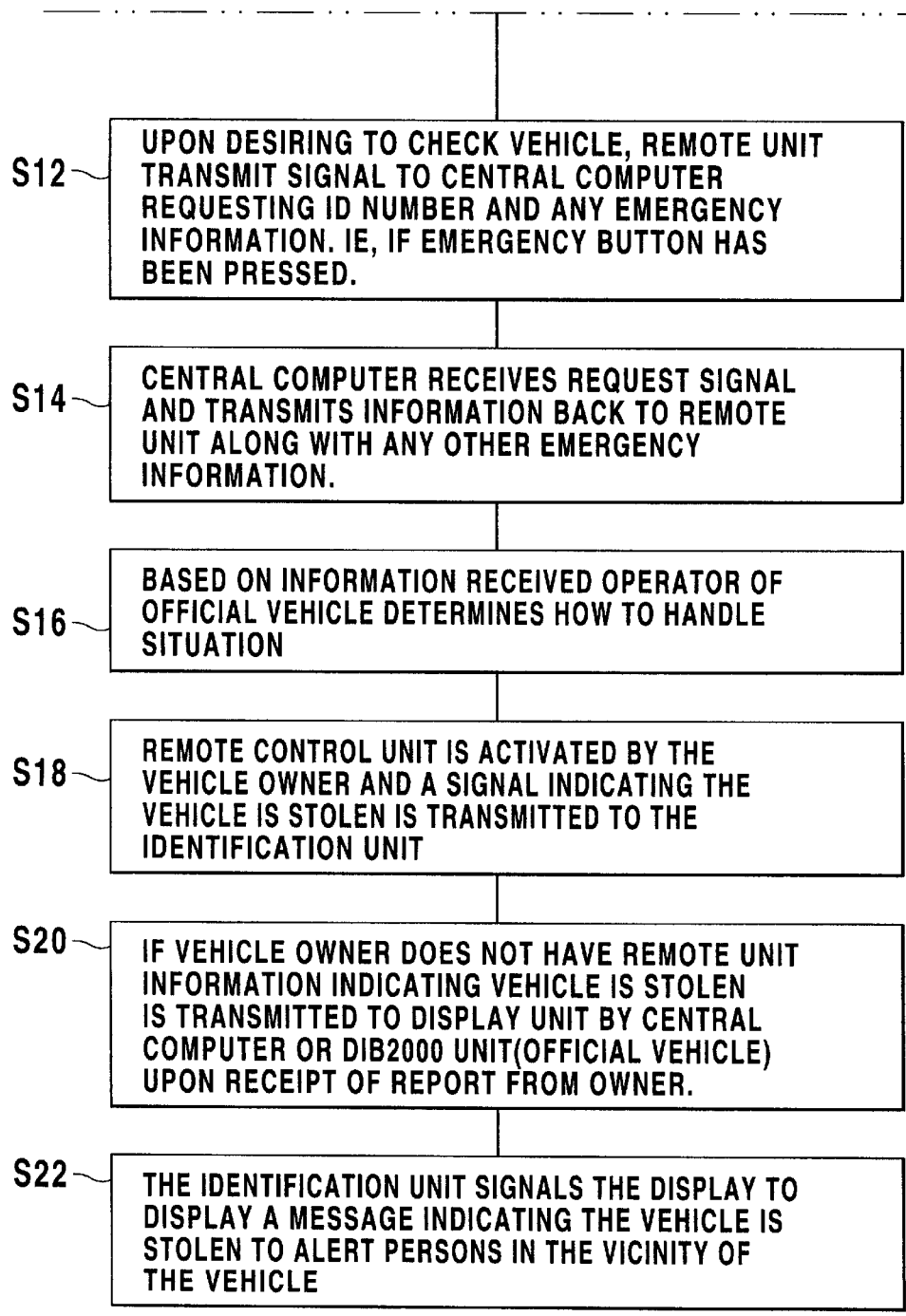
FIG. 6 is a flow chart illustrating the operating process of the vehicle identification and information system of the present invention.

The operation of the device and system will now be described with specific reference to FIG. 6. In step S2, a vehicle 12 is equipped with the identification device 14 including an emergency button 16 located within the vehicle 12 and a display device 28 located in a visible position on an outer side of the vehicle 12. The display 28 is preferably located on the tailgate of the vehicle 12. Upon registration of the vehicle 12 pertinent information regarding the vehicle 12 including identification of the driver and insurance information are input into the central computer 22 as described in step S4. Official vehicles 18 are then equipped with remote units 20 for receiving information on vehicles 12 equipped with the identification unit 14 as stated in step S6. Now the system 10 is in place and operating. An official vehicle 18 equipped with a remote unit 20 can now receive information regarding the registration status, insurance status, driver information and vehicle information on any vehicle including the identification unit 14.

As described in steps S8 and S10, the central computer 22 continually transmits an information signal to the identification unit 14 containing information on the identified vehicle 12. The information received from the central computer 22 is then displayed on the display unit 28 for viewing by persons in the vicinity of the vehicle 12.

Upon desiring to check the status of a vehicle 12, the official operating the official vehicle 18 transmits a signal to the central computer 22 requesting the information on the vehicle 12, as stated in step S12. The central computer 22 then transmits the information signal and any other emergency information back to the remote unit 20 as described in step S14. The requester is an official having clearance to obtain such information and is normally requesting the information from an official vehicle 18 equipped with a remote unit 20. Based upon the information received, an official utilizing the system will make a determination whether or not to stop the vehicle 12 as stated in step S16.

The remote control unit 24 may be activated by the owner 26 of the vehicle 12 to transmit a signal to the identification unit 14 indicating the vehicle 12 has been stolen as described in step S18. If the owner does not have a remote control unit 24, information indicating the vehicle 12 is stolen may be transmitted to the display unit 28 by the central computer 22 or by the remote unit 20 upon receipt of a report from the owner as stated in step S20. Upon receipt of the transmitted distress signal the identification unit 14 will display a message on the display 28 indicating the vehicle 12 has been stolen to alert both persons in the vicinity of the vehicle 12 and law enforcement personnel so they may take appropriate action in stopping the vehicle 12 as stated in step S22.

From the above description it can be seen that the vehicle identification and information system of the present invention is able to overcome the shortcomings of prior art devices by providing a vehicle identification and information system which is able to warn others as to an emergency situation in a vehicle and includes a central computer able to relay information to a police vehicle regarding the insurance status and record of any violations on a vehicle. The vehicle identification system is able to inform others if a vehicle has been stolen and provide other vehicle status information on the vehicle. The vehicle identification system also includes a switch which will inform others as to an emergency situation within the vehicle when activated even when the vehicle is traveling. Furthermore, the vehicle identification and information system of the present invention is simple and easy to use and economical in cost to manufacture.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A vehicle identification and information monitoring system for a plurality of vehicles comprising:
    a) an identification unit in each of said vehicles being monitored, a remote unit installed in one or more official vehicles, and a central computer;
    b) each an identification unit comprising a first receiver for receiving information signals from an central computer, a first microprocessor connected to the first receiver for processing the information signals, first display means for displaying status of insurance, theft and other pertinent information continuously regarding said vehicle connected to an first microprocessor and positioned on the outside of said vehicle, and an emergency signaling device connected to said first microprocessor for transmitting a distress signal to said first microprocessor for display on said first display means;
    c) each an remote unit comprising a second transmitter for transmitting an information request signal to said central computer, a second receiver for receiving an information signal from said central computer, a second microprocessor connected to said second receiver for processing the information signal received from said central computer, and second display means for displaying within said official vehicle said information signal received from said central computer; and
    d) said central computer storing information on said plurality of vehicles, receiving information request signals from a remote unit about a specific vehicle, generating the information requested from the remote unit, and transmitting an information signal about the status of said specific vehicle to the remote unit requesting the information and to the identification unit in said specific vehicle for display of said status on the outside of the specific vehicle by said first display means.

2. The vehicle identification and information system as recited in claim 1, further comprising a remote control unit for transmitting a distress signal to the identification unit in a vehicle for display on said first display means.

3. The vehicle identification and information system as recited in claim 1, wherein an information signal includes data representative of a registration status of said vehicle identified by an information request signal.

4. The vehicle identification and information system as recited in claim 1, wherein an information signal includes data representative of an insurance status of said vehicle identified by an information request signal.

5. The vehicle identification and information system as recited in claim 1, wherein an information signal includes data representative of a state of registration of an vehicle identified by an information request signal.

6. The vehicle identification and information system as recited in claim 1, wherein an information signal includes data representative of a license plate number of a vehicle identified by an information request signal.

7. The vehicle identification and information system as recited in claim 1, wherein said official vehicle is a police car.

8. The vehicle identification and information system as recited in claim 1, wherein an information signal includes data representative of a registration status, an insurance status, state of registration and license plate number of the vehicle identified by said request information signal.

9. The method of monitoring a plurality of vehicles comprising the steps of:
    a) installing an identification unit in each of said vehicles being monitored, a remote unit in one or more official vehicles, and a central computer in a fixed location;
    b) each an identification unit receiving information signals from said central computer, processing the information signals, and displaying status of insurance, theft and other pertinent information continuously regarding the vehicle containing the identification unit on the outside of the vehicle, using an emergency signaling device within the vehicle for transmitting a distress signal for display on the outside of the vehicle and transmitting said distress signal to an central computer, and receiving an information signal from said central computer for processing the information signal received and displaying within said official vehicle said information signal received from said central computer; and
    c) said central computer receiving information request signals from said remote unit, storing information on said plurality of vehicles and generating information signals for transmission to said identification unit for display on the outside of each of said plurality of vehicles and to said display in said remote unit in response to receipt of an information request signal from a remote unit.

* * * * *